United States Patent [19]
Ceska et al.

[11] 4,398,957
[45] Aug. 16, 1983

[54] MORTAR LATEX MIX

[75] Inventors: Gary W. Ceska, Paoli, Pa.; Gerald W. Burkhart, Parkersburg, W. Va.

[73] Assignee: Polysar International S.A., Fribourg, Switzerland

[21] Appl. No.: 340,117

[22] Filed: Jan. 18, 1982

Related U.S. Application Data

[63] Continuation of Ser. No. 234,437, Feb. 13, 1981, abandoned, which is a continuation-in-part of Ser. No. 108,769, Dec. 31, 1979, abandoned.

[51] Int. Cl.$^3$ .................................................. C04B 7/35
[52] U.S. Cl. .................................................. 106/90
[58] Field of Search ............... 106/90, 314; 524/5, 524/6

[56] References Cited

U.S. PATENT DOCUMENTS 3,582,376  6/1971  Ames ................................... 106/90
4,088,804  5/1978  Cornwell et al. ................... 106/314
4,092,109  5/1978  Rosenberg et al. ................ 106/314

*Primary Examiner*—James Poer
*Attorney, Agent, or Firm*—Hubert E. Evans

[57] ABSTRACT

Improved Portland cement compositions are provided by the use of a combination of additives which increase plasticity and allow the use of less water. When the mixture is cured or set, the resultant concrete has higher compressive strength, higher flexural and shear strength, is believed to be markedly less susceptible to penetration by moisture or corrosive liquids, and have greater freeze-thaw stability. Such concrete is highly advantageous in thin paving sections such as bridge deck overlays, overpasses, elevated freeways and the like. The preferred additives are a latex of a styrene-butadiene containing polymer and a dispersing agent such as a polymerized naphthalene sulfonic acid or a salt thereof.

5 Claims, No Drawings

MORTAR LATEX MIX

This is a continuation of application Ser. No. 234,437, filed Feb. 13, 1981, which is a continuation-in-part of Ser. No. 108,769, filed Dec. 31, 1979, both abandoned.

BACKGROUND OF THE INVENTION

It is well known that dispersing agents are useful additives to cementitious materials and especially Portland cement. By more effectively dispersing the cement paste, the aggregate particles, reinforcement, fillers, pigments, or other ingredients of the final mixture are more homogeneously coated and the resulting concrete product has more compressive strength. Because the dispersing agent does not function to increase adherence as one of its prime properties, the resulting concrete with the dispersing agent alone does not generally show an improvement in internal adherence or in adherence to adjacent material; and accordingly, the flexural strength of the resulting concrete is not increased. Further, outside of some relatively minor increase in density due to the greater homogeneity, penetration or resistance to absorption of liquids is not achieved by the use of a dispersing agent alone.

Latexes are also well-known additives for use with cementitious material and Portland cement mortar mixtures. Latexes of rubbery polymers are known to provide greater continuity throughout the mixture and thus a greater adherence within the mixture as well as adherence to adjacent materials. It is thus known that the use of latex does provide an increase in the flexural strength of concrete when it is an additive to the cement mixture. It also provides greater plasticity and workability to the mixture, and a reduction in the viscosity of the mixture, permitting a reduction of the water to cement ratio. The rubber film forming latex extends throughout the cured concrete and appears to reduce the penetration and increase the resistance to absorption of liquids, especially corrosive salt solutions. This is extremely beneficial when the cement mixture is used for concrete pavements by reducing the amount of attack caused by the salts used for ice and snow prevention or removal.

U.S. Pat. No. 3,677,780 illustrates the use of a beta-naphthalenesulfonic acid-formaldehyde condensate as an additive to cement to obtain increased compressive strength. The patent teaches that the use of the additive has an even greater effect in increasing compressive strength than the mere reduction of the water cement ratio. However, there is no disclosure whatsoever of the use of a latex as an additional component to the cement mortar mixture.

U.S. Pat. No. Re. 28,722, reissued Feb. 24, 1976, discloses the use of about 5-25% based on the weight of Portland cement of a styrene-butadiene copolymer latex, and a combination of three surfactants, one anionic, one non ionic and a polyorganosiloxane.

U.S. Pat. No. 2,662,064 shows a cementitious pumpable coating composition including cement, both a fibrous filler and a non-fibrous filler, a stabilized latex, and a water soluble thickener. The requirement of a thickener causes an interference to the curing action of the cementitious material being used and would defeat the purpose of the feasibility of the present invention. The lowest amount of latex disclosed is an amount equal to the amount of dry cement, and this proportion of latex would not result in a workable concrete for the purposes of the present invention.

SUMMARY OF THE INVENTION

It has been found that an improved cement mortar composition, especially a composition comprising Portland cement, aggregate and water useful in thin sections such as bridge overlays and the like may be provided which comprises additionally a latex of a styrene-butadiene containing polymer and a dispersing agent which in combination increase the compressive stength and the flexural strength of the cured cement mortar, permit a reduction in the amount of water and provide a plastic flowable mix. The concrete is believed to have greater freeze-thaw stability and the penetration by moisture and corrosive salt solutions is believed to be reduced.

The preferred latex additive is a styrene-butadiene containing polymer having a styrene to butadiene ratio of from about 40:60 to about 70:30, and the preferred dispersing agent is a polymerized or condensed alkyl substituted or unsubstituted naphthalene sulfonic acid, particularly the sodium salt thereof.

DETAILED DESCRIPTION OF THE INVENTION

This invention relates to the improvement of cementitious compositions and while it will be described in connection with Portland cement mortar compositions it will obviously be equally applicable to provide improved compositions using gypsum, plaster of paris and other cementitious materials.

The cement composition of the present invention will provide concrete using a lower water:cement ratio and having higher compressive strength and higher flexural strength. It is believed that this concrete will also have greater freeze-thaw stability, reduced penetration by moisture and corrosive salt solutions, and a reduced tendency to leaching and/or efflorescence. Such a concrete is highly useful for the paving of thin concrete sections found in bridge deck overlays, over-passes, ramps, elevated sections of freeways, and the like. For this work it is desirable to use a non-air entraining Portland cement denoted in the trade as type I or II conforming to the requirements of ASTM C 150 for Portland cement.

In addition to the cementitious material, it is customary to use a mineral aggregate, examples of which are sand, limestone, and gravel. Generally, it is desirable for the sand to conform to the requirements of ASTM C 33 for concrete sand. The total amount of aggregate used for this type of concrete is normally from about 3.0 to about 5.0 parts by weight, preferably from about 4.0 to about 4.5 parts, of aggregate per 1 part by weight of Portland cement.

The first of the combination of 2 additives making up the present invention is a latex of a polymer. Suitable polymers include styrene-butadiene containing polymers, preferably styrene-butadiene polymers, more preferably styrene-butadiene polymer containing a minor amount of N-methylolacrylamide, and most preferably styrene-butadiene polymers containing minor amounts of acrylonitrile and N-methylolacrylamide, the amount of polymer in the latex not being critical but desirably from about 25 to about 60 percent by weight. Further, the ratio between the styrene and butadiene content of the polymer is a relatively critical factor. The amount of styrene content serves to add strength while the butadiene content provides the rubbery and flexural properties and it is necessary to obtain the right balance in order to obtain a suitable commercial product. A styrene-butadiene containing polymer having a weight ratio of styrene to butadiene within the range of from about 40:60 to about 70:30 is desirable and a particularly desirable range in the styrene to butadiene ratio runs from about 60:40 to about 67:33. At a styrene content in the polymer above about 70% a dried film derived from the latex has substantially lost its rubbery texture and becomes a more brittle film. For the purposes of the present invention, the styrene content needs to be sufficiently high to provide the increased strength properties but at the same time adequate butadiene content must be provided so that the dry polymer film has a rubbery texture. The amount of N-methylolacrylamide in styrene-butadiene polymers containing a minor amount of this monomer is from about 0.5 to about 5.0 parts, preferably from about 1.0 to about 3.0 parts, by weight of the polymer. The amounts of acrylonitrile and N-methylolacrylamide in styrene-butadiene polymers containing minor amounts of both of these monomers each are from about 0.5 to about 5.0 parts, preferably from about 1.0 to about 3.0 parts, by weight of the polymer. The total amount of both monomers is from about 1.0 to about 6.0 parts, preferably from about 2.0 to about 5.0 parts, by weight of the polymer.

In the cement mix, it is desirable that the polymer component of the latex be present in an amount from about 1 to about 15 parts by weight per 100 parts by weight of cement—i.e. is based on the polymer content of the latex, which is known from the solids content thereof, and not based on the latex per se. Hereinafter, this weight of polymer is referred to as being on a dry weight basis. It has been found that when the polymer addition for this type of latex is greater than about 15 parts the resultant strength of the cured concrete diminishes very rapidly.

The dispersing agent is another critical component of the present invention. It is desirable to use a polymerized or condensed alkyl substituted or unsubstituted naphthalene sulfonic acid or salt thereof. One such product is sold under the trademark DAXAD 11 by W. R. Grace and Company. Another such product is sold under the trademark LOMAR D by Diamond Shamrock Corporation. There are several similar types of such dispersing agents available. When the dispersing agent is a sodium salt of a condensed mono naphthalene sulfonic acid, better results are obtained. This component is added to the cement mix in an amount of from about 0.5 to about 8 weight percent of the latex on a dry weight basis, with a particularly preferential rate being from about 3 to about 4 weight percent. It is important that there be no carboxylation of either the latex or the dispersing agent. Test work has shown that if there is any carboxylation, the improvements to the mortar mixture are deteriorated by some action not presently understood.

The making of the improved cementitious mortar mixture is not a critical part of the present invention. In accordance with the general practice, the cement and aggregate materials are mixed together and stirred or agitated in a normal cement mixer in their dry or semi-dry condition for approximately 5 minutes. After this, the latex, dispersing agent and water are combined and added. Mixing is continued until a smooth, homogeneous mixture is obtained. In connection with the water, care must be taken to determine the water content of the aggregate prior to its use so that the additional water added is minimal. The present invention contemplates that the weight ratio of water to cement for best results be maintained within the range of from about 0.3:1 to about 0.4:1 and preferably within the range of from about 0.3:1 to about 0.35:1. Obviously, the amount of water added controls this water:cement ratio and it is desired that it be maintained at this relatively low level. An acceptable slump of from about 4 to about 7 inches may be obtained for mortar mixes using this water:cement ratio.

To illustrate the present invention, cement/mortar mixes were made and tested as described in the Examples which follow.

EXAMPLE 1

This Example compares the properties of Portland cement mortar mixes without either additive and mixes with both additives. Samples A, B and C were made up using the formulations shown in Table I using the procedure described hereinabove. The water content of all of the components was predetermined and an additional amount was added to give the total water content in parts by weight shown in Table I. All other parts shown are by dry weight. Sample A served as a control and contained no latex and no dispersing agent.

TABLE I

|  | SAMPLE | | |
| --- | --- | --- | --- |
|  | A | B | C |
| Portland Cement (Type II non-air entraining | 16.6 | 16.7 | 16.8 |
| Limestone (0.75 inch, washed) | 31.3 | 31.5 | 31.6 |
| Sand | 43.1 | 43.4 | 43.5 |
| Total water content | 9.0 | 5.85 | 5.5 |
| Latex[1.] | 0 | 2.52 | 2.52 |
| Dispersing Agent[2.] | 0 | 0.03 | 0.08 |

[1.]Aqueous latex of a 66:34:2:2.5 styrene-butadiene-acrylonitrile-N—methylolacrylamide polymer, with pH = 9.4 and 47 percent solids content.
[2.]Sodium salt of a condensed mono naphthalene sulfonic acid sold under the tradename Lomar D by Diamond Shamrock Corp.

Test specimens of concrete were prepared from each of Samples A, B and C. Slump was measured according to ASTM C 143. Air content was measured using a Forney air pressure meter available from Forney's Incorporated, using the instructions supplied with the instrument. The water:cement ratio was the weight ratio of total water content to cement. Compressive strength was measured after curing the samples under moist burlap for 7 days according to ASTM C 873. Flexural strength was also measured after this 7 day curing period according to ASTM C 683. Shear bond tests were used to measure the bonding of a new concrete mix to an older existing subsurface. Concrete bases 2 inches high and 6 inches in diameter were made up to serve as existing subsurfaces, using 14.2 parts by weight Portland cement (Type I non-air entraining according to ASTM C 150), 31.5 parts by dry weight of sand conforming to ASTM C 33, 47.2 parts by dry weight of gravel and 7.1 parts total of water which were mixed in the conventional manner. Concrete samples were formed in cylindrical molds 4 inches high by 6 inches in diameter by half-filling each mold with the above mixture. These samples were aired in the molds for 7 days under moist burlap and for a further 21 days in air to provide the existing subsurface bases for shear bond testing. The top surface of each of these samples was then sandblasted to remove about 0.175 inches from the surface in order to remove fines and loose aggregate, and then washed with a garden hose. While this surface was still wet, the remaining 2 inches of the mold were filled with the new cement mix to be tested. The samples were then cured for 7 days under moist burlap and in air for a further 21 days. The shear bond strength of the interface between the existing concrete and the new concrete was then measured according to the Arizona shear bond test method outlined in the Federal Highway Administration Report No. FHWA-RD-78-35 entitled "Styrene Butadiene Latex Modifiers for Bridge Deck Overlay Concrete". A comparison of the physical properties of the samples is given in Table II. The data for compressive, shear bond and flexural strength are averages from three test specimens each.

TABLE II

| | SAMPLE | | |
|---|---|---|---|
| | A | B | C |
| Compressive strength, psi | 3937 | 4280 | 4927 |
| Shear bond strength, psi | 465 | 470 | 515 |
| Flexural strength, psi | 744 | 879 | 1121 |
| Water:Cement Ratio | 0.54 | 0.35 | 0.33 |
| Slump, inches | 5 | 5 | 4 |
| Air content, percent | 3.0 | 4.9 | 4.2 |

It will be noted from Table II that the compressive strength, shear bond strength and flexural strength were all increased by the use of the latex and the dispersing agent, (Sample B vs. Sample A) and increased even more with additional dispersing agent (Sample C). Further, with approximately the same amount of slump, the water:cement ratio dropped from a normal 0.54 for the control Sample A to the markedly lower values of 0.35 and 0.33 when both of the additives were present. This lowering of the water:cement ratio will provide by itself a more dense, higher strength concrete.

EXAMPLE 2

In this Example, additional samples of concrete mix were prepared in accordance with the procedure followed as described above in Example 1. In this case a comparison was made to illustrate what varying amounts of the dispersing agent accomplished for a constant amount of the latex additive. This is illustrated by the preparation of Samples D through I as shown in Table III. Materials used were the same as those described in connection with Example 1.

TABLE III

| | SAMPLE | | | | | | | | | |
|---|---|---|---|---|---|---|---|---|---|---|
| | D | E | F | G | H | I | J | K | L | M |
| Portland Cement | 16.65 | 16.6 | 16.7 | 16.7 | 16.8 | 16.8 | 16.7 | 16.8 | 16.7 | 16.7 |
| Limestone | 31.4 | 31.4 | 31.5 | 31.6 | 31.7 | 31.8 | 31.5 | 31.7 | 31.5 | 31.5 |
| Sand | 43.25 | 43.2 | 43.3 | 43.4 | 43.6 | 43.7 | 43.4 | 43.6 | 43.4 | 43.4 |
| Total water Content | 6.2 | 6.3 | 6.0 | 5.7 | 5.4 | 5.1 | 5.8 | 5.2 | 5.7 | 5.7 |
| Latex | 2.53 | 2.53 | 2.53 | 2.54 | 2.55 | 2.56 | 2.54 | 2.55 | 2.54 | 2.54 |
| Dispersing Agent | 0 | 0.01 | 0.03 | 0.04 | 0.05 | 0.08 | 0.08 | 0.10 | 0.15 | 0.20 |

The physical properties of Samples D through I are given in Table IV. Slump, air content and water:cement ratio were obtained as described in connecton with Example 1. Compressive strength data were obtained according to ASTM C 873 after curing to 7 days under moist burlap and/or after air curing for a further 21 days. Shear bond strength data were obtained as described in connection with Example 1 after curing for 7 days under moist burlap and/or after air curing for a further 21 days. Again compressive and shear bond strength data are averages from three test specimens each.

TABLE IV

| | SAMPLE | | | | | | | | | |
|---|---|---|---|---|---|---|---|---|---|---|
| | D | E | F | G | H | I | J | K | L | M |
| Compressive Strength after 7 days, psi | 3330 | — | — | — | — | — | 3540 | — | 2690 | 5135 |
| Compressive Strength after 28 days, psi | 4910 | 4983 | 5217 | 5157 | 5110 | 5500 | 5090 | 5410 | 5400 | 6890 |
| Shear bond strength after 7 days, psi | 353 | — | — | — | — | — | 455 | — | 430 | 340 |
| Shear bond strength after 28 days, psi | 620 | — | — | — | — | — | 620 | — | 645 | 630 |
| Water:Cement ratio | 0.37 | 0.38 | 0.36 | 0.34 | 0.32 | 0.30 | 0.35 | 0.31 | 0.34 | 0.34 |
| Slump, inches | 5.0 | 6.0 | 5.0 | 5.5 | 5.5 | 4.5 | 7.0 | 4.0 | 6.0 | 8.0 |
| Air content, percent | 5.5 | 3.5 | 3.75 | 3.0 | 3.0 | 3.0 | 5.1 | 3.5 | 4.6 | 4.8 |

It will be noted from Table IV that at a constant amount of the latex additive, the general trend is of increasing compressive strength with increasing amounts of added dispersing agent. The amount of dispersing agent has little effect on the shear bond strength.

EXAMPLE 3

Additional concrete samples were prepared as described in connection with Example 1 to illustrate what the addition of varying amounts of latex accomplished with approximately equal amounts of added dispersing agent. Samples N through Q were prepared as shown in Table V using the same materials as described in connection with Example 1.

TABLE V

|  | SAMPLE | | | |
| --- | --- | --- | --- | --- |
|  | N | O | P | Q |
| Portland Cement | 16.8 | 16.8 | 16.8 | 16.8 |
| Limestone | 31.6 | 31.6 | 31.7 | 31.7 |
| Sand | 43.5 | 43.5 | 43.6 | 43.6 |
| Total water content | 6.0 | 5.5 | 5.9 | 5.2 |
| Latex | 2.04 | 2.55 | 2.04 | 2.55 |
| Dispersing Agent | 0.025 | 0.032 | 0.081 | 0.10 |

Physical properties of these samples were determined as described in connection with Examples 1 and 2 and are listed in Table VI.

TABLE VI

|  | SAMPLE | | | |
| --- | --- | --- | --- | --- |
|  | N | O | P | Q |
| Compressive Strength after 28 days, psi | 5483 | 5196 | 5626 | 5410 |
| Shear bond strength after 28 days, psi | 435 | 421 | — | 443 |
| Flexural strength after 28 days, psi | 1041 | 973 | — | 1040 |
| Water:cement ratio | 0.36 | 0.33 | 0.35 | 0.31 |
| Slump, inches | 4.0 | 5.0 | 5.0 | 4.0 |
| Air content, percent | 4.5 | 4.8 | 3.5 | 3.8 |

It will be noted from Table VI by comparing Samples N and P (each containing 12 parts by dry weight of latex per 100 parts by weight of cement) with Samples O and Q respectively (each containing 15 parts of latex on the same basis), that the compressive strength decreases.

EXAMPLE 4

Additional samples were prepared to illustrate the effect upon the concrete properties of changing the monomer composition of the latex. Samples R and S use the latex of Example 1 and contain styrene, butadiene, acrylonitrile and N-methyolacrylamide in the ratio of 66:34:2:2.5. Samples T and U use a latex without the acrylonitrile monomer with a ratio of styrene, butadiene and N-methylolacrylamide of 66:34:2.5. All other physical properties of the latexes are the same. All samples were made up as described in connection with Example 1. Lomar D was again used as the dispersing agent and each Sample contained 15 parts by dry weight latex per 100 parts cement. Data are given in Table VII.

TABLE VII

|  | SAMPLE | | | |
| --- | --- | --- | --- | --- |
|  | R | S | T | U |
| Weight percent dispersing agent based on dry weight of latex | 1.25 | 4.0 | 1.25 | 4.0 |
| Compressive strength after 7 days, psi | 3963 | 4747 | 4460 | 5127 |
| Water:cement ratio | 0.36 | 0.31 | 0.37 | 0.36 |
| Slump, inches | 5.5 | 5.5 | 5.0 | 5.75 |
| Air content, percent | 5.6 | 3.0 | 3.5 | 3.5 |

Increasing the amount of dispersing agent again increases the compressive strength of the concrete using both the latex containing all four monomers (Samples R and S) and the latex containing no acrylonitrile (Samples T and U).

What we claim is:

1. A process of producing a concrete paving which comprises:
    (a) preparing a cement mortar composition of Portland cement, aggregate, water, from about 1 to about 15 parts by weight on a dry weight basis per 100 parts of cement of a latex of a polymer comprising from about 40 to 70 parts by weight of styrene, from about 60 to 30 parts by weight of butadiene, from about 0.5 to about 5.0 parts of N-methylolacrylamide by weight of said polymer, or from about 0.5 to about 5.0 parts by weight each of N-methylolacrylamide and acrylonitrile by weight of said polymer, said parts in total of N-methylolacrylamide and acrylonitrile being from about 1.0 to about 6.0 parts by weight of said polymer, and a dispersing agent being a polymerized or condensed alkyl substituted or unsubstituted naphthalene sulfonic acid or salt thereof in an amount of from about 0.5 to about 8 weight percent of the polymer content of said latex; which composition provides increased compressive and flexural strength when cured and permits a reduction in the water content thereof while providing a plastic flowable mix;
    (b) applying the mixed composition as a layer to a pavement sub-base; and
    (c) curing the pavement.
2. The process of claim 1 wherein said dispersing agent is a sodium salt of a condensed mononaphthalene sulfonic acid.
3. The process of claim 1 wherein said dispersing agent is added in an amount from about 3 to about 4 weight percent of the polymer content of said latex.
4. The process of claim 1 wherein said styrene-butadiene ratio is from about 60:40 to about 67:33.
5. The process of claim 1 wherein said polymer is a styrene-butadiene polymer containing from about 1.0 to about 3.0 parts of N-methylolacrylamide by weight of said polymer or from about 1.0 to about 3.0 parts each of N-methylolacrylamide and acrylonitrile by weight of said polymer, said parts in total of N-methylolacrylamide and acrylonitrile being from about 2.0 to about 5.0 parts by weight of said polymer.

* * * * *